US010309553B1

(12) United States Patent
Schwalbe et al.

(10) Patent No.: US 10,309,553 B1
(45) Date of Patent: Jun. 4, 2019

(54) HOSE CLAMP ASSEMBLY

(71) Applicant: CNH Industrial America LLC, New Holland, PA (US)

(72) Inventors: Blaine A. Schwalbe, Valders, WI (US); Kerry J. Treinen, Malone, WI (US); Stephen Moretti, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/815,178

(22) Filed: Nov. 16, 2017

(51) Int. Cl.
*F16L 3/01* (2006.01)
*F16L 3/12* (2006.01)
*F16L 3/22* (2006.01)
*H02G 11/00* (2006.01)
*F16G 11/00* (2006.01)
*E02F 9/22* (2006.01)
*F16L 3/10* (2006.01)
*B05B 15/62* (2018.01)
*B05B 15/16* (2018.01)
*H02G 3/30* (2006.01)
*F16L 3/223* (2006.01)

(52) U.S. Cl.
CPC ............ *F16L 3/222* (2013.01); *B05B 15/62* (2018.02); *E02F 9/2275* (2013.01); *F16L 3/1091* (2013.01); *B05B 15/16* (2018.02); *F16L 3/2235* (2013.01); *H02G 3/30* (2013.01); *H02G 11/00* (2013.01)

(58) Field of Classification Search
CPC ........ F16L 3/222; F16L 3/2235; B05B 15/16; B05B 15/62; E02F 9/2275; H02G 3/30; H02G 3/08; H02G 7/08

USPC .............. 248/65, 68.1, 67.7, 74.1, 58, 67.5; 174/155; 211/59.1, 59.4
See application file for complete search history.

(56) References Cited

U.S. PATENT DOCUMENTS

| 2,356,318 | A | | 8/1944 | Hayman |
| 2,404,531 | A | * | 7/1946 | Robertson ............. F16L 3/2235 |
| | | | | 248/68.1 |
| 2,937,835 | A | | 5/1960 | Csmereka |
| 3,044,530 | A | | 7/1962 | Jones |
| 3,180,598 | A | | 4/1965 | Girard |
| 3,216,683 | A | | 11/1965 | Girard |

(Continued)

FOREIGN PATENT DOCUMENTS

DE 20000250 U1 5/2000

*Primary Examiner* — Tan Le
(74) *Attorney, Agent, or Firm* — Rebecca L. Henkel; Rickard K. DeMille

(57) ABSTRACT

A hose clamp assembly for use with an agricultural machine that help to route hoses or other elongate routed components about the agricultural machine. The hose clamp assembly may include a first clamp block having first and second outer walls, with at least a first set of openings formed in one of the first and second outer walls. Additionally, the first clamp block may further include a second set of openings formed into the other of the first and second outer walls. The first clamp block may be secured to the agricultural machine, to a mounting bracket, or to a lock plate. Additionally, the hose clamp assembly may have a second clamp block having third and fourth outer walls. The second clamp block may have a third set of openings formed therein, as well as a fourth set of openings. The clamp blocks may be mounted to one another.

20 Claims, 5 Drawing Sheets

(56) References Cited

U.S. PATENT DOCUMENTS

| | | | | |
|---|---|---|---|---|
| 4,892,275 | A | * | 1/1990 | Szegda .................... H02G 7/08 |
| | | | | 248/61 |
| 5,123,547 | A | * | 6/1992 | Koch .................... F16L 3/2235 |
| | | | | 248/68.1 |
| 5,794,897 | A | | 8/1998 | Jobin et al. |
| 5,992,802 | A | | 11/1999 | Campbell |
| 6,193,195 | B1 | | 2/2001 | Owens |
| 6,227,502 | B1 | | 5/2001 | Derman |
| 7,922,012 | B2 | | 4/2011 | Sisley |
| 8,294,030 | B2 | * | 10/2012 | Pollard, Jr. .............. H02G 3/30 |
| | | | | 174/155 |
| 8,940,438 | B2 | * | 1/2015 | Kim ....................... B82Y 30/00 |
| | | | | 429/218.1 |
| 2004/0244188 | A1 | | 12/2004 | Hutchinson |
| 2005/0173597 | A1 | | 8/2005 | Farrell et al. |
| 2010/0123048 | A1 | | 5/2010 | Pollard, Jr. |
| 2010/0258687 | A1 | | 10/2010 | Celikkol |
| 2012/0032036 | A1 | | 2/2012 | Andersson et al. |
| 2014/0175231 | A1 | * | 6/2014 | Cox ........................ F16L 3/222 |
| | | | | 248/68.1 |
| 2015/0129725 | A1 | | 5/2015 | Zedan |
| 2015/0192225 | A1 | | 7/2015 | Vo |

\* cited by examiner

HOSE CLAMP ASSEMBLY

FIELD OF THE INVENTION

The invention relates generally to agricultural product application equipment or agricultural machines such as self-propelled sprayers and, in particular, to a hose clamp assembly to secure a hose or hoses relative to the sprayer, with at least one clamp block configured to accommodate hoses of various diameters.

BACKGROUND OF THE INVENTION

High-clearance sprayers are getting larger and more complex to allow for increasing coverage in a single pass, which improves application efficiency. These high-clearance sprayers require numerous hoses, tubes, and the like for hydraulic systems, wet systems that include liquid product and rinse liquid dispensing capabilities, and other systems such as brake hand propel hoses. Many of the hoses, tubes, and the like have different diameters. Routing and securing such elongate routed components can be an important part of vehicle design in order to provide a neat appearance while offering protection for the hoses, tubes and the like. However, the lengths and bulk of the hoses, tubes, and the like of large and complex off-road agricultural vehicles make them difficult to work with, which can make repeatable installation difficult and time-consuming.

Sometimes, these hoses and tubes are routed through two hose-supporting plates that are mounted upright, aligned with each other, and extend transversely from an outside wall of the frame. Both of these plates have openings extending into their outer edge or edges to accommodate the hoses and tubes. Typically, an inside plate holds propel hoses and an outside plate holds suspension cross-over hoses, case drain hoses, park brake hoses, and dynamic/service brake hoses. As a result, multiple different parts need to be inventoried for the different hose-supporting plates, which have to be separately installed. Additionally, the outer plate must be completely removed to service the hoses held by the inside plate.

SUMMARY OF THE INVENTION

A hose clamp assembly for use with an agricultural machine with a first clamp block and a. second clamp block to support and protect various hoses routed along the agricultural machine.

According to an aspect of the invention, the first clamp block may include interconnected outer walls, such as a first outer wall and a second outer wall, that collectively define an outer perimeter of the first clamp block. The first outer wall may face the opposite direction of the second outer wall, The outer perimeter of the first clamp block may include a first set of openings that extend as depressions into a first outer wall of the first clamp block. Additionally, the outer perimeter may include a second set of openings that extend as depressions into the second outer wall of the first clamp block.

According to another aspect of the invention, the second clamp block also may include interconnected outer walls, such as a third outer wall and a fourth outer wall, that collectively define an outer perimeter of the second clamp block. The third outer wall may face the opposite direction of the fourth outer wall. The outer perimeter of the second clamp block may include a third set of openings that extends as depressions into the third outer wall. Also, the outer perimeter may include a fourth set of openings that extend as depressions into the fourth outer wall.

According to yet another aspect of the invention, the first clamp block and the second clamp block engage each outer where the first outer wall and the third outer wall are in a face-to-face abutment. As a result, the first and third set of openings of the first and second clamp blocks are aligned with each other to provide discrete openings that extend through the entire thickness of each of the first and second clamp blocks. These openings can support a first set of hoses of the agricultural machine that extend through the hose clamp assembly.

According to another aspect of the invention, at least one of the second outer wall and the fourth outer wall may engage a surface of the agricultural machine to define a closure wall that extends across at least one of the second and the fourth set of openings to support a second set of hoses of the agricultural machine. Similarly, one of the second outer wall and the fourth outer wall may be mounted directly against a frame of the agricultural machine to define a closure wall that extends across at least one of the second and fourth sets of openings to support the second set of hoses of the agricultural machine. Alternatively, the hose clamp assembly may also feature a locking plate that engages at least one of the second outer wall and the fourth outer wall to define a closure wall that extends across at least one of the second and fourth set openings to support a second set of hoses of the agricultural machine. Alternatively still, the hose clamp assembly may feature a mounting bracket that is mounted to a frame of the agricultural machine, where at least one of the second outer wall and the fourth outer wall engage with the mounting bracket to define a closure wall that extends across at least one of the second and fourth set of openings to support a second set of hoses of the agricultural machine.

According to another aspect of the invention, the hose clamp assembly may define a first assembled position and a second assembled position, In the first assembled position, the first clamp block and the second clamp block may engage each other with the first outer wall and the third outer wall being in face-to-face abutment. In the second assembled position, the second outer wall and the fourth outer wall may engage each other in face-to-face abutment so that the second and fourth set of openings of the first and second clamp blocks are aligned with each other to provide discrete openings that extend through the entire thickness of each of the first and second clamp blocks for supporting a second set of hoses of the agricultural machine that extend through the hose clamp assembly.

According to yet another aspect of the invention, the hose clamp assembly may also have a fifth set of openings and a sixth set of openings. The fifth set of openings may extend as depressions into the first outer wall of the first clamp block. The sixth set of openings may extend as depressions into the third wall of the second clamp block. When in the first assembled position, the fifth set of openings and the sixth set of openings are aligned with each other to provide discrete openings that extend through the entire thickness of each of the first and second clamp blocks for supporting a third set of hoses of the agricultural machine that extend through the hose clamp assembly. Additionally, the third set of hoses may have a diameter different from the first set of hoses and the second set of hoses.

According to another aspect of the invention, the first set of openings and the third set of openings may include at least three semi-circular openings having a first diameter. Similarly, the second set of openings may also have at least three semi-circular openings having a second diameter. Further still, the fourth set of openings of the second clamp block may include at least four semi-circular openings having a third diameter. Each of the first diameter, the second diameter, and the third diameter may be different.

According to yet another aspect of the invention, the openings are configured to house hoses selected from a group including a hydraulic hose, a propel hose, a suspension hose, a case drain hose, a parking brake hose, and a. service hose.

According to yet another aspect of the invention, the hose clamp assembly has a first clamp block and a second clamp block. The first clamp block may include a first outer edge and a second outer edge opposite the first outer edge. The first clamp block may have a first plurality of semi-circular openings that extend from the first outer edge toward the second outer edge, and a second plurality of semi-circular openings extending from the second outer edge toward the first outer edge. The second clamp block may include a third outer edge and a fourth outer edge opposite the third outer edge. Additionally, the second clamp block may include a third plurality of semi-circular openings extending from the third outer edge toward the fourth outer edge. Further still, the second clamp block may include a fourth plurality of semi-circular openings extending from the fourth outer edge toward the third outer edge.

According to another aspect of the invention, the first plurality of semi-circular openings may align with the third plurality semi-circular openings when the first outer edge abuts the third outer edge in a first configuration. In the first configuration, a first hose is held between the first clamp block and the second clamp block. Alternatively, the second plurality of semi-circular openings may align with the fourth plurality of semi-circular openings when the second outer edge abuts the fourth outer edge in a second configuration. In the second configuration, a second hose is held between the first clamp block and the second clamp block. Additionally, the first hose may have a first diameter and the second hose may have a second diameter, where the first diameter is larger than the second diameter. The hose clamp assembly may additionally have a fifth plurality of semi-circular openings extending from the first outer edge to the second outer edge and a sixth plurality of semi-circular openings extending from the third outer edge toward the fourth outer edge. In the first configuration, the fifth plurality of semi-circular openings may align with the sixth plurality of semi-circular openings when the first outer edge abuts the third outer edge. Furthermore, the second clamp block may be substantially identical to the first clamp block.

In accordance with yet another aspect of the invention, the first clamp block may have a first bevel formed in the first outer edge and the second clamp block may have a second bevel formed in the third outer edge. The second clamp block may pivot relative to the first clamp block about the first bevel and the second bevel. Additionally, when. the second clamp block pivots away from the first clamp block, the first hose and the third hose may be released.

According to another aspect of the invention, the hose clamp assembly may have a first clamp block and a first plate. The first clamp block may include a first outer wall and a second outer wall opposite the first outer wall. The first outer wall and the second outer wall may define an outer perimeter of the first clamp block. The outer perimeter of the first clamp block may include a first set of openings that extends as depressions into the first outer wall. The first plate may be configured to cover the first set of openings to form a closure wall that extends across the first set of openings to support a first set of hoses of the agricultural machine. The first plate may also include a covering section that lies flat against the first outer wall and an outer section that extends angularly away from the covering section.

According to another aspect of the invention, the hose clamp assembly may include a second clamp block and a second plate. For instance, the second clamp block may include a third outer wall and a fourth outer wall that defines an outer perimeter of the second clamp block. The outer perimeter may include a third set of openings that extends as depressions into the third outer wall. Additionally, the second plate may be configured to cover the third set of openings to form a closure wall that extends across the first set of openings to support a third set of hoses of the agricultural machine. Further still, the second plate may include a covering section and an outer section. The covering section may lie flat against the third outer wall, and the outer section may extend angularly from the covering section. Additionally, the outer section of the first plate may support the fourth outer wall.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
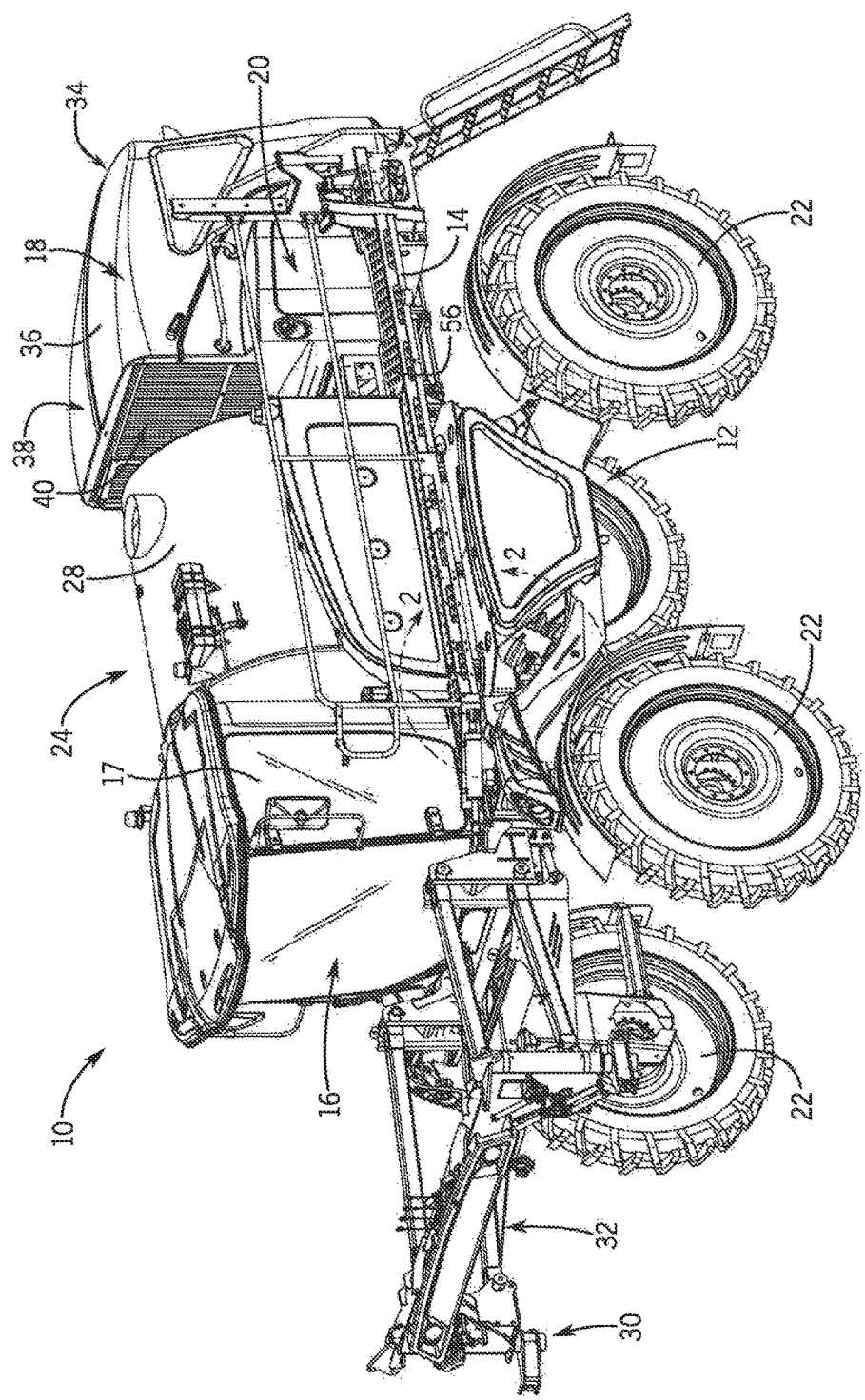
FIG. 1 is an isometric view of an agricultural machine.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and. New Holland Guardian Series sprayers.

Still referring to FIG. 1, sprayer 10 includes a chassis 12 having a chassis frame 14 that supports various assemblies, systems, and. components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

A hose clamp assembly 50 for use with the sprayer 10 that is provided to route and secure elongate routed components such as hoses, tubes, and other flexible members 52 that are routed through or along the sprayer 10 will now be described in greater detail. The specification shall simply refer to hoses hereafter, although it should be known that other components could be housed and routed through the hose clamp assembly 50, including elongate routed components, tubular members, tubes, lines, and other flexible members that may house various components associated with operation of the sprayer 10.

By way of example, but not limitation, the hoses may include hydraulic hoses, propel hoses, suspension hoses, case drain hoses, parking brake hoses, and service brake hoses. Additionally, while some exemplary hoses 52 are included in the figures, it should be known that these hoses are exemplary and that additional hoses 52 could also be routed. through the hose clamp assembly 50.

It is also understood that the hose clamp assembly 50 could similarly be used with other machines including vehicles and other towed implements requiring routing of elongate routed components and hoses. While the figures show the hose clamp assembly 50 in specific locations relative to the chassis frame 14, it should be noted these views are exemplary and that the hose clamp assembly 50 could similarly be mounted anywhere else relative to the chassis frame 14 or sprayer 10.

The specific configuration of the hose clamp assembly 50 can vary based on a number of different factors, including for instance the size of the hose or hoses 52 being routed therein; the specific component contained within the hose or hoses 52; the location of components associated with the contents of the hose or hoses 52; the location of the hose clamp assembly 50 relative to the sprayer 10 and/or chassis frame 14; and frequency with which the hose or hoses 52 may need to be removed or inspected for maintenance purposes. Additionally, the number of openings or channels formed in the various clamp blocks, as well as the specific size or shape of the openings may similarly vary. While any number of hose clamp assemblies 50 may be used, some exemplary embodiments will be further described below.

Figure 2:
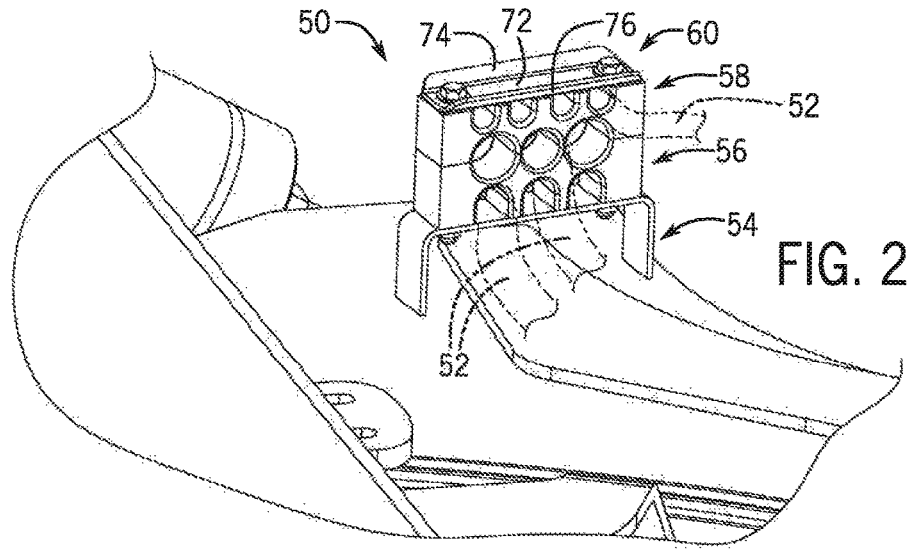
FIG. 2 is a detailed isometric view of e underside of the agricultural machine showing a hose clamp assembly.
Figure 3:
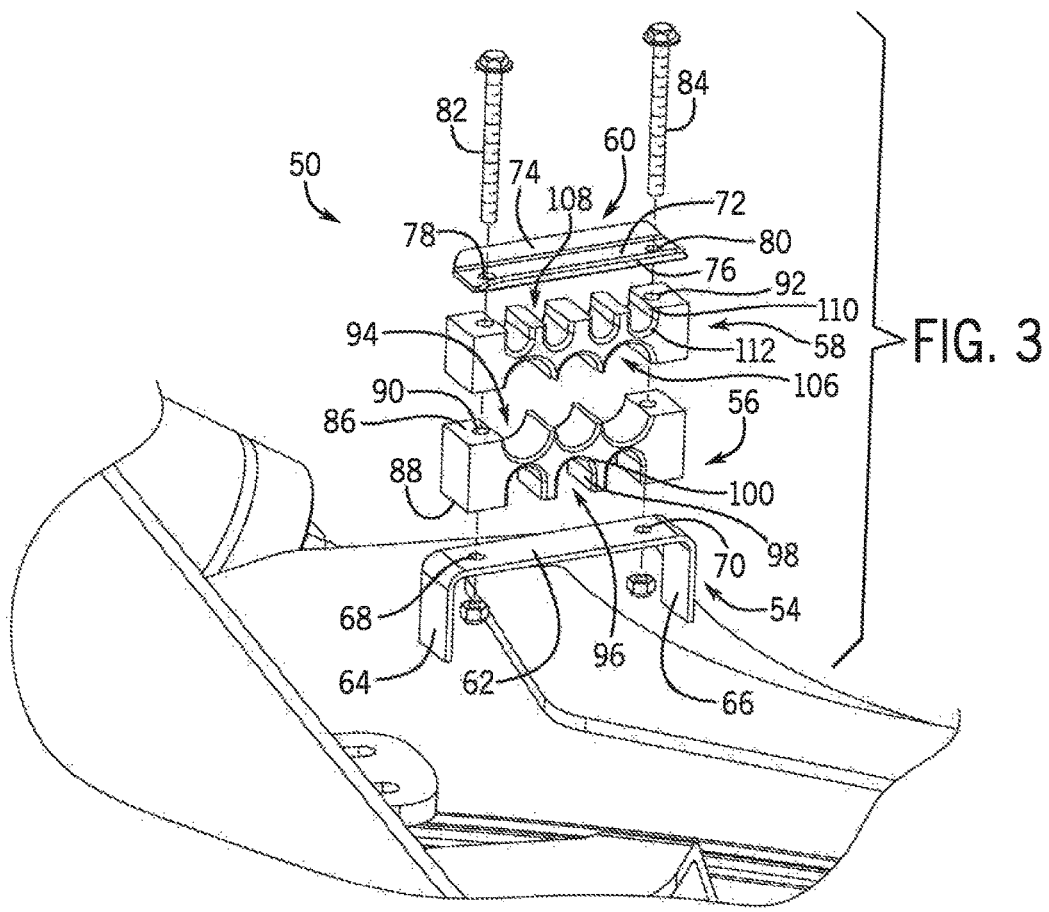
FIG. 3 is a detailed exploded isometric view of the hose clamp assembly exploded away from the underside of the agricultural machine of FIG. 2.

Turning initially to FIGS. 2 and 3, a first embodiment of the hose clamp assembly 50 is shown. As shown in this embodiment, the hose clamp assembly 50 may include a mounting bracket or plate 54, a first clamp block 56, a second clamp block 58, and a first plate or locking plate 60. The mounting bracket 54 includes a base 62 and two legs 64, 66 that extend substantially perpendicular to the base 62. The two legs 64, 66 may be attached to the chassis frame 14 of the sprayer 10. For instance, the two legs 64, 66 may be welded or bolted to an underside of the sprayer 10. Additionally, the base 62 may include openings, as seen two openings 68, 70 located adjacent to either leg 64, 66. Of course, the hose clamp assembly 50 need not require a mounting bracket 54. Instead one of the first clamp block 56 and the second clamp block 58 could also be mounted directly to the sprayer 10, for instance to the chassis frame 14 to form channels between the openings of the first clamp block 56 or second clamp block 58 and a closure wall defined by the chassis frame 14 as will further be described below.

The first plate 60 may have a base 72 with two flanged sides 74, 76. Also, the first plate 60 may similarly have openings formed in its base 72, as seen two openings 78, 80, that align with the openings 68, 70 formed in the base 62 of the mounting bracket 54. These openings 78, 80 are configured to accommodate bolts 82, 84 that may be inserted through the mounting bracket 54, the first clamp block 56, the second clamp block 58, and the first plate 60 to secure the first clamp block 56, the second clamp block 58, and the first plate 60 to the underside of the chassis frame 14. As seen in FIG. 2, the overall footprint of the mounting bracket 54, the first clamp block 56, the second clamp block 58, and the first plate 60 are substantially the same, such that these components align when installed to create a. clean look without edges or corners that would easily catch on other components.

Still looking to FIGS. 2 and 3, the first clamp block 56 may include a first outer wall 86 and a second outer wall 88 having opposing surfaces that collectively define an outer perimeter of the first clamp block 56. The first outer wall 86 and the second outer wall 88 face in opposite directions of the first clamp block 56. Additional openings 90 extend through the first clamp block 56 from the first outer wall 86 to the second outer wall 88. Similar openings 92 extend through the second clamp block 58. These openings 90, 92 are configured to align with the openings 68, 70 formed in the mounting bracket 54 and the openings 78, 80 formed in the first plate 60 for securing the various components to the chassis frame 14.

The first outer wall 86 may include a plurality of substantially concave-shaped openings formed therein. For instance, a first set of openings 94 may extend as depressions into the first outer wall 86 of the first clamp block 56. More particularly, the first set of openings 94 extend from the first outer wall 86 approximately halfway through the first clamp block 56 towards the second outer wall 88. As shown, the first set of openings 94 include three openings that are semi-circular in shape, with each opening being substantially equal in size.

Additionally, the second outer wall 88 may include a plurality of substantially concave-shaped openings formed therein. As shown, a second set of openings 96 may extend as depressions into the second outer wall 88 of the first clamp block 56. More specifically, the second set of openings 96 extend from the second outer wall 88 approximately halfway through the first clamp block 56 towards the first outer wall 86. As shown, the second set of openings 96 include three openings that have a substantially rectangular section 98 that terminates in a semi-circular shape 100, with each opening being substantially equal in size. This second set of openings 94 are configured to house at least one hose 52 having a second diameter, which may contain various components. Of course, up to three hoses having the second diameter could similarly be mounted within each of the second set of openings 94. When the first clamp block 56 is installed to the mounting bracket 54, the mounting bracket 54 may form a closure wall where the space between this second set of openings 94 and the mounting bracket 54 form three channels extending through the first clamp block 56.

Turning next to the second clamp block 58, an outer perimeter is formed of a third outer wall 102 and a fourth outer wall 104. The third outer wall 102 and the fourth outer wall 104 have opposing surfaces that face in opposite directions of the second clamp block 58. More openings extend through the second clamp block 58 from the third outer wall 102 to the fourth outer wall 104 as will be described below.

The third outer wall 102 may include a plurality of substantially concave-shaped openings formed therein, For instance, a third set of openings 106 may extend as depressions into the third outer wall 102 of the second clamp block 58. More particularly, the third set of openings 106 extend from the third outer wall 102 approximately halfway through the second clamp block 58 towards the fourth outer wall 104. As shown, the third set of openings 106 include three openings that are substantially semi-circular in shape, with each opening being substantially equal in size. This third set of openings 106 are substantially the same size as the first set of openings 94 of the first clamp block 56. Additionally, the third set of openings 106 should be located about the third outer wall 102 in substantially the same location as the first set of openings 94 relative to the first outer wall 86. The first set of openings 94 and the third set of openings 106 should therefore align when the first and second clamp blocks 56, 58 are in face-to-face abutment to form three additional channels that extend through the entire thickness of the first clamp block 56 and the second clamp block 58. These channels are configured to receive at least one hose 52, which may contain various components, having a first diameter. Of course, u.p to three hoses having the first diameter could similarly be mounted within the each of the three channels.

Further still, the fourth outer wall 104 may include another plurality of substantially concave-shaped openings formed therein. As shown, a fourth set of openings 108 may extend as depressions into the fourth outer wall 104 of the second clamp block 58. Specifically, the fourth set of openings 108 may extend from the fourth outer wall 104 approximately halfway through the second clamp block 58 towards the third outer wall 102. As shown, the fourth set of openings 108 include four openings having a substantially rectangular section 110 that terminates in a semi-circular shape 112, with each opening being substantially equal in size. This fourth set of openings 108 are configured to receive at least one hose 52, which may contain various components, having a third diameter. When the first plate 60 is installed, the first plate 60 may form a closure wall where the space between the fourth set of openings 108 and the first plate 60 form four channels extending through the second clamp block 56.

As a result, the channels associated with first set of openings 94 and the third set of openings 106 have a first size or diameter. Additionally, the channels formed between the second set of openings 96 and the mounting bracket 54 have a second size or diameter. Finally, the channels formed between the fourth set of openings 108 and the first plate 60 have a third size or diameter. As shown, the first size is smaller than the second size, but larger than the third size. Also, the third size is smaller than the second size. Of course, the sizes of these channels relative to one another could also change depending on the specific hoses 52 that need to be routed through a given hose clamp assembly 50.

Turning next to FIGS. 4-8, another embodiment of the hose clamp assembly 50a is shown. Like the embodiment shown in FIGS. 2 and 3 above, this embodiment includes a first clamp block 56a with a first set of openings 94a in a first outer wall 86a and a second set of openings 96a in the second outer wall 88a; and a second clamp block 58a with a third set of openings 106a in a third outer wall 102a and a fourth set of openings 108a in a fourth outer wall 104a. Either of the first clamp block 56a or the second clamp block 58a could be installed directly against the sprayer 10, for instance, against the chassis frame 14, or to a mounting bracket 54 similar to that shown in FIGS. 2 and 3.

Figure 4:
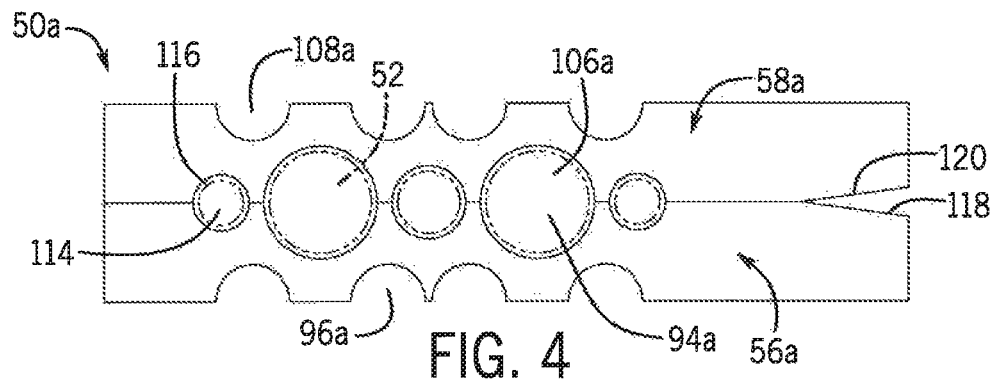
FIG. 4 is a side elevation view of anotherembodiment of the hose clamp assembly in a first position.
Figure 5:
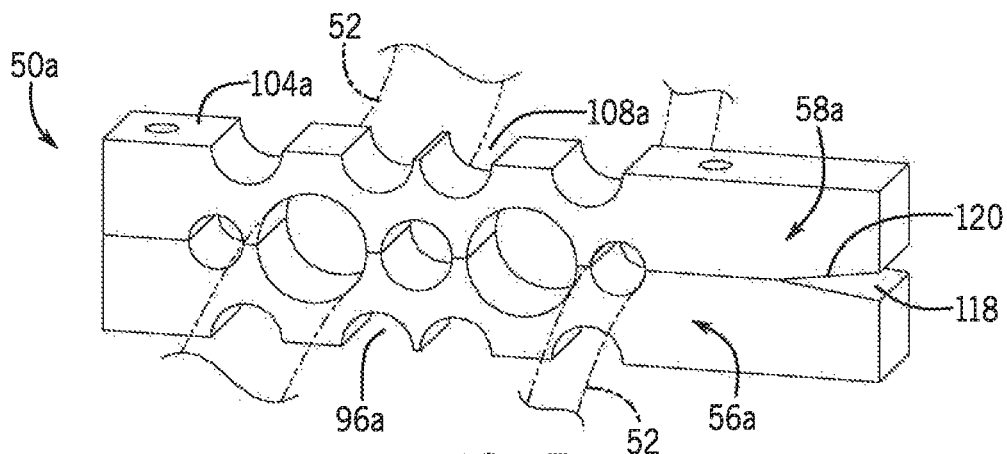
FIG. 5 is an isometric view of the hose clamp assembly of FIG. 4.
Figure 6:
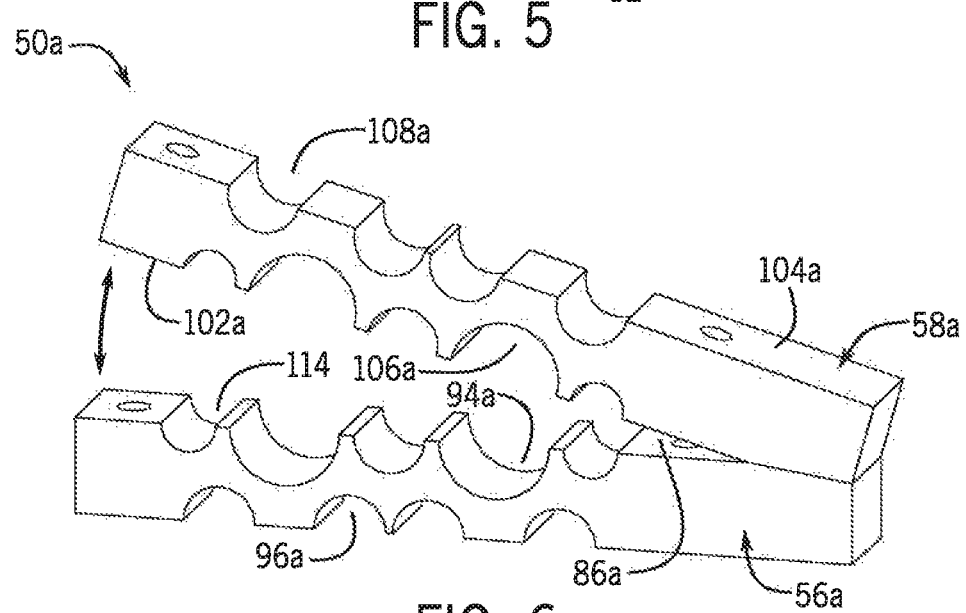
FIG. 6 is an isometric view of the hose clamp assembly of FIGS. 4 and 5 where one of the clamp blocks is pivoted away from the other clamp block.
Figure 7:
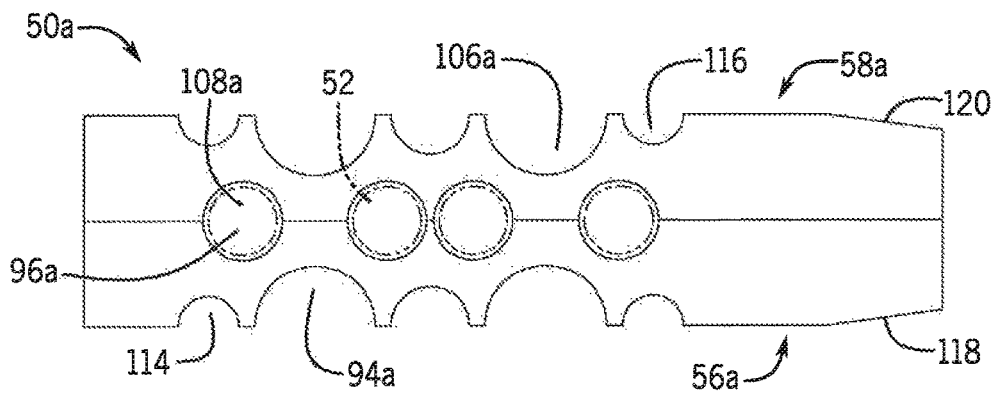
FIG. 7 is a side elevation view of the hose clamp assembly of FIGS. 4-6 where the clamp blocks are inverted to a second position.
Figure 8:
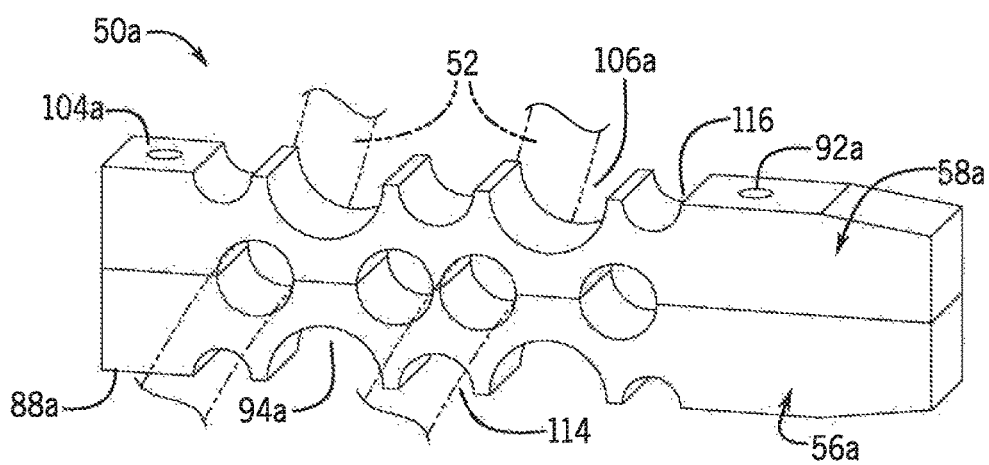
FIG. 8 is an isometric view of the hose clamp in a second position of FIG. 7.

However, unlike the embodiment shown in FIGS. 2 and 3, the first clamp block 56a and the second clamp block 58a are substantially the same in shape. This would allow a single clamp block configuration to be stocked for use with the hose clamp assembly 50a. As a result, the hose clamp assembly 50a may define a first assembled position, as seen in FIGS. 4-6, and a second assembled position as seen in FIGS. 7 and 8. To convert the hose clamp assembly 50a from the first assembled position to the second assembled position, the first clamp block 56a and the second clamp block 58a need to simply be inverted. When in the first assembled position, the first clamp block 56a and the second clamp block 58a engage each other with the first outer wall 86a of the first clamp block 56a and the third outer wall 102a of the second clamp block 58a in face-to-face abutment. In the second assembled position, the first clamp block 56a and the second clamp block 58a are engaged with each other with the second outer wall 88a of the first clamp block 56a and the fourth outer wall 104a of the second clamp block 58a in face-to-face abutment. As a result, in the first assembled position, the first set of openings 94a and the third set of openings 106a may align. Alternatively, in the second assembled position, the second set of openings 96a and the fourth set of openings 108a may align. This would allow a single clamp block shape to be needed to result in two different clamp block positions featuring different opening sizes. Further still, regardless of whether the hose clamp assembly 50a is in a first assembled position or a second assembled position, one or both of the first clamp block 56a and the second clamp block 58a could be mounted to a locking plate and/or a mounting bracket to form additional channels. Alternatively still, in some embodiments, the first clamp block 56a and the second clamp block 58a only have one assembled position in which respective openings align.

Still looking to FIGS. 4-8, the first clamp block 56a could further include a fifth set of openings 114 that may extend as depressions into the first outer wall 86a. The fifth set of openings 114 may again extend from the first outer wall 86a to the second outer wall 88a. As shown, both the first set of openings 94a and the fifth set of openings 114 are substantially semi-circular in shape. However, the first set of openings 94a could be formed of a first diameter and the fifth set of openings 114 could be formed of a fifth diameter. As shown, the first diameter is greater than the fifth diameter. As a result, the first set of openings 96a extend approximately halfway through the first clamp block 56a from the first outer wall 86a to the second outer wall 88a, while the fifth set of openings 114 extend less than halfway through the first clamp block 56a from the first outer wall 86a to the second outer wall 88a.

Similarly, the second clamp block 58a could further include a sixth set of openings 116 that may extend as depressions into the third outer wall 102. Again, the sixth set of openings 116 may extend from the third outer wall 102a to the fourth outer wall 104a. Both the third set of openings 106a and the sixth set of openings 116 are substantially semi-circular in shape. That said, the third set of openings 106a could be formed of a third diameter and the sixth set of openings 116 could be formed of a sixth diameter. As shown, the third diameter is greater than the sixth diameter. Therefore, the third set of openings 106a may extend approximately halfway through the second clamp block 58a from the third outer wall 102a to the fourth outer wall 104a, while the sixth set of openings 116 extend less than halfway through the second clamp block 58a from the third outer wall 102a to the fourth outer wall 104a.

As a result, when the first outer wall 86a of the first clamp block 56a engages the third outer wall 102a of the second clamp block 58a in face-to-face abutment in the first position, the first set of openings 94a align with the third set of openings 106a, and the fifth set of openings 114 align with the sixth set of openings 116. In turn, the hose clamp assembly 50a has channels of two different sizes that are capable of housing hoses 52 of two different sizes. Of course, additional hoses could be housed in channels formed between the second set of openings 96a and/or the fourth set of openings 108a while in the first position, either by using a mounting bracket, a locking plate, or by mounting one of the clamp blocks 56a, 58a directly to the sprayer 10, for instance the chassis frame 14 of the agricultural machine.

Additionally, the first clamp block 56a may include a first bevel 118 formed in one of its walls, as shown the first outer wall 86a, and the second clamp block 58a may include a second bevel 120 formed in one of its walls, as shown, the third outer wall 102a. These bevels 118, 120 provide a tapered surface at one end of the clamp blocks 56a, 58a. These bevels 118, 120 enable pivotable motion of one of the clamp blocks relative to another of the clamp blocks. As shown in FIG. 6, this pivotable motion allows one of the clamp blocks to remain in place, for instance mounted to the sprayer 10, while the other pivots away. This allows hoses that were previously secured between the first clamp block 56a and the second clamp block 58a to be released from between the hose clamp assembly 50a.

Figure 9:
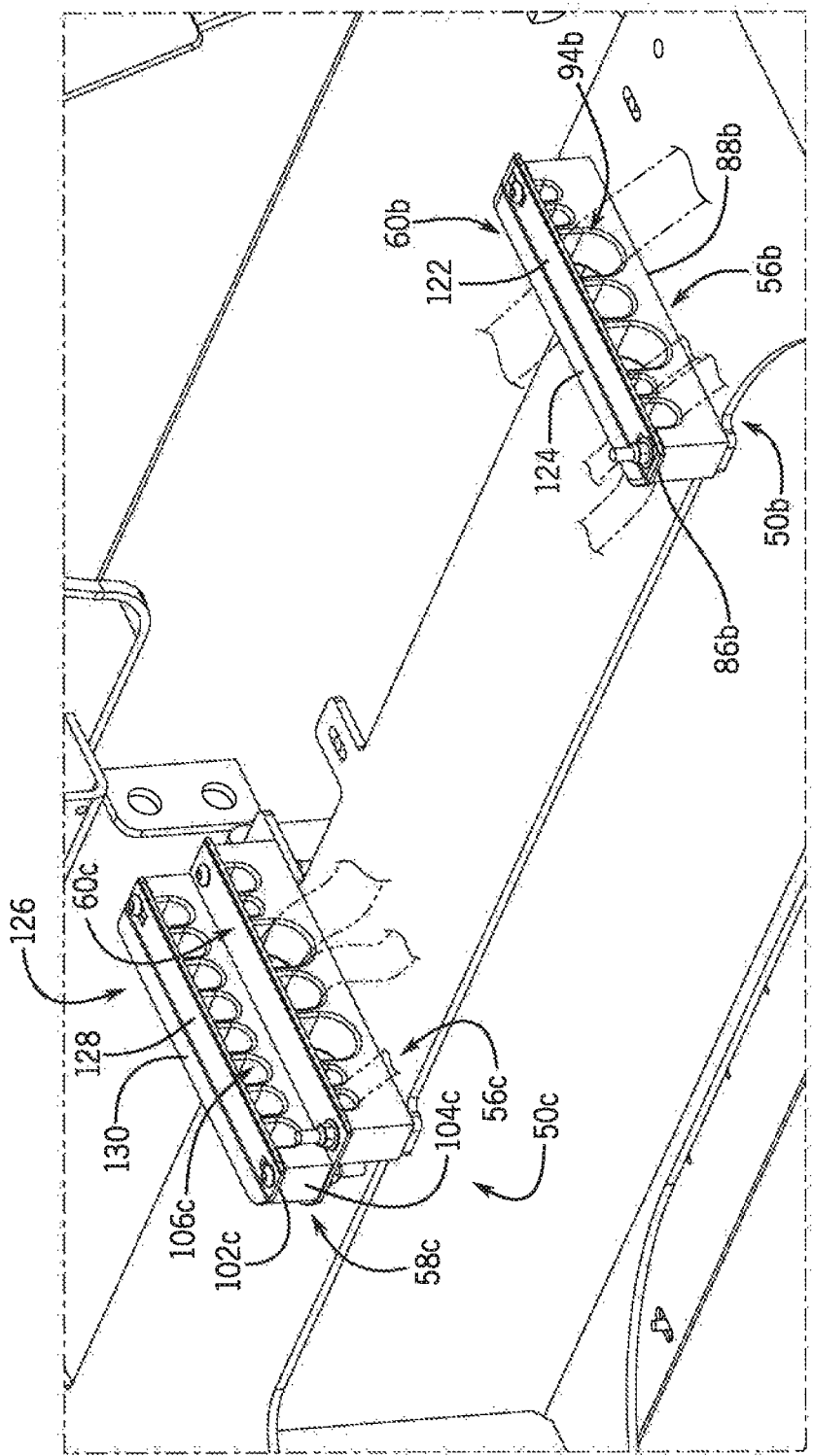
FIG. 9 is an isometric view of another embodiment of the hose clamp assembly mounted to the underside of the agricultural machine.

Although FIGS. 2-8 show a single hose clamp assembly 50a, it should be noted that multiple hose clamp assemblies may be attached to the chassis frame 14 or other aspects of the sprayer 10 to allow for routing of hoses 52 anywhere about the sprayer 10. For instance, as shown in FIG. 9, multiple hose clamp assemblies 50b, 50c may be located substantially parallel to one another to ensure that the hose 52 is held securely and closely to the chassis frame 14 along the entire length of the hose 52. Where multiple hose clamp assemblies are used, each hose clamp assembly can be spaced apart from one another to provide a secure mounting of the hoses 52 about the sprayer 10. Furthermore, each of the hose clamp assemblies associated with the multiple hose clamp assemblies can be in different configurations or embodiments or each could be of the same configuration.

FIG. 9 shows yet another embodiment of the inventive hose clamp assembly 50b. For instance, looking to the right side of the figure, a single clamp block 56b is shown mounted to the chassis frame 14 of the sprayer 10. Like the previous embodiments, this first clamp block 56b has first and second outer walls 86b, 88b opposite one another. However, in this embodiment, the first clamp block 56b only has openings formed in the first outer wall 86b, and the second outer wall 88b is substantially planar. More specifically, the first clamp block 56b has a first set of openings 94b. As shown, the first set of openings 94b have a variety of different sized openings formed in the first outer wall 86b, each of which could house hoses 52 of different sizes. The first set of openings 94b extend as depressions into the first outer wall 86b.

Additionally, this hose clamp assembly 50b includes a first plate or lock plate 60b that is configured to cover the first set of openings 94b to form a closure wall. This closure wall may extend across the first set of openings 94b to support a first set of hoses 52 associated with the sprayer 10. The first plate 60b may also feature a covering section. 122 and an outer section 124, Again, similar to the previous embodiments, the covering section 122 may have a pair of holes (not shown) that coincide with holes formed in the first clamp block 56b that allow the covering section 122 to be secured to the first clamp block 56b. The outer section 124 is configured to extend angularly away from the covering section 122.

Still looking at FIG. 9, another embodiment of the inventive hose clamp assembly 50c is shown on the left side of the figure. This embodiment includes a first clamp block 56c and a first plate 60c identical to the first clamp block 56b and the first plate 60b described relative to hose clamp assembly 50b shown on the right side of the figure. However, this embodiment also includes a second clamp block 58c as well as a second plate or lock plate 126. Like the previous embodiments, this second clamp block 58c has third and fourth outer walls 102c, 104c opposite one another. However, in this embodiment, the second clamp block 58c only has openings formed in the third outer wall 102c, and the fourth outer wall 104c is substantially planar. More specifically, the second clamp block 58c has a third set of openings 106c formed in the third outer wall 102c. As shown, each of the third set of openings 106c are of substantially the same size. This third set of openings 106c extend as depressions into the third outer wall 102c. As shown, the second clamp block 58c is mounted to the outer section 124 of the first plate 60b. In this way, the first clamp block 56c and the second clamp block 58c form a towered, stack configuration. Of course, any of the other clamp blocks described above could similarly be installed in a towered, stack configuration.

Like the first plate 60c, the second plate 126 is configured to cover the third set of openings 106c to form a closure wall. This closure wall may extend across the third set of openings 106c to support a third set of hoses 52 associated with the sprayer 10. The second plate 126 may also feature a covering section 128 and an outer section 130. Again, similar to the previous embodiments, the covering section 128 may have a pair of holes (not shown) that coincide with holes 92 formed in the second clamp block 56c that allow the covering section 128 to be secured to the second clamp block 58c. The outer section 130 is configured to extend angularly away from the covering section 128. Of course, additional clamp blocks could be installed, for instance, a third clamp block mounted to the second plate. Additional clamp blocks could similarly be mounted to additional plates.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A hose clamp assembly for use with an agricultural machine, the hose clamp assembly comprising:
    a first clamp block that includes interconnected outer walls that collectively define outer perimeter of the first clamp block, the outer perimeter of the first clamp block defining:
        a first set of openings that extends as depressions into a first outer wall of the first clamp block; and
        a second set of openings that extends as depressions into a second outer wall of the first clamp block that faces an opposite direction than the first outer wall of the first clamp block;
    a second clamp block that includes interconnected outer walls that collectively define an outer perimeter of the second clamp block, the outer perimeter of the second clamp block defining:
        a third set of openings that extends as depressions into a third outer wall of the second clamp block; and
        a fourth set of openings that extends as depressions into a fourth outer wall of the second clamp block that faces an opposite direction than the first outer wall of the first clamp block; and
    wherein:
        the first and second clamp blocks engage each other with the first outer wall of the first clamp block and the third outer wall of the second clamp block in face-to-face abutment so that the first and third set of openings of the first and second clamp blocks are aligned with each other to provide discrete openings that extend through the entire thickness of each of the first and second clamp blocks for supporting a first set of hoses of the agricultural machine that extend through the hose clamp assembly; and
        a bevel is formed in at least one of the outer perimeters of the first and second clamp blocks, the vevel facilitating the pivoting of the first and second clamp blocks relative to each other.

2. The hose clamp assembly of claim 1, wherein at least one of the second outer wall and the fourth outer wall of the first and second clamp blocks is configured to be engageable with a surface of the agricultural machine to define a closure wall that extends across at least one of the second and fourth sets of openings to support a second set of hoses of the agricultural machine.

3. The hose clamp assembly of claim 1, wherein one of the second outer wall and the fourth outer wall of the first and second clamp blocks is configured to be mountable directly adjacent to a frame of the agricultural machine to define a closure wall that extends across at least one of the second and fourth sets of openings to support a second set of hoses of the agricultural machine.

4. The hose clamp assembly of claim 1, further comprising a locking plate that engages at least one of the second outer wall and the fourth outer wall of the first and second clamp blocks to define a closure wall that extends across at least one of the second and fourth sets openings to support a second set of hoses of the agricultural machine.

5. The hose clamp assembly of claim 1, wherein the hose clamp assembly defines:
    a first assembled position when the first and second clamp blocks engage each other with the first outer wall and the third outer wall of the first and second clamp blocks in face-to-face abutment; and
    a second assembled position when the first and second clamp blocks engage each other with the second outer wall and the fourth outer wall of the first and second clamp blocks in face-to-face abutment so that the second and fourth set of openings of the first and second clamp blocks are aligned with each other to provide discrete openings that extend through the entire thickness of each of the first and second clamp blocks for supporting a second set of hoses of the agricultural machine that extend through the hose clamp assembly.

6. A hose clamp assembly assembly for use with an agricultural machine, the hose clamp assembly comprising:
    a first clamp block that includes interconnected outer walls, that collectively define an outer perimeter of the first clamp block, the outer perimeter of the first clamp block defines:
        a first set of openings that extends as depressions into a first outer wall of the first clamp block; and
        a second set of openings that extends as depressions into a second outer wall of the first clamp block that faces an opposite direction than the first outer wall of the first clamp block;
    a second clamp block that includes interconnected outer walls that collectively define an outer perimeter of the second clamp block, the outer perimeter of the second clamp block defines:
        a third set of openings that extends as depressions into a third outer wall of the second clamp block; and
        a fourth set of openings that extends as depressions into a fourth outer wall of the second clamp block that faces an opposite direction than the first outer wall of the first clamp block;
    wherein:
        a fifth set of openings that extends as depressions into the first outer wall of the first clamp block;
        a sixth set of openings that extends as depressions into the third outer wall of the second clamp block;
        the first and second clamp blocks engage each other with the first outer wall of the first clamp block and the third outer wall of the second clamp block in face-to-face abutment so that the first and third set of openings of the first and second clamp blocks are aligned with each other to provide discrete openings that extend through the entire thickness of each of the first and second clamp blocks for supporting a first set of hoses of the agricultural machine that extend through the hose clamp assembly;
        the hose clamp assembly defines:
            a first assembled position when the first and second clamp blocks engage each other with the first outer wall and the third outer wall of the first and second clamp blocks in face-to-face abutment; and
            a second assembled position when the first and second clamp blocks engage each other with the second outer wall and the fourth outer wall of the first and second clamp blocks in face-to-face abutment so that the second and fourth set of openings of the first and second clamp blocks are aligned with each other to provide discrete openings that extend through the entire thickness of each of the first and second clamp blocks for supporting a second set of hoses of the agricultural machine that extend through the hose clamp assembly, in the first assembled position the fifth set of openings and the sixth set of openings are aligned with each other to provide discrete openings that extend through the entire thickness of each of the first and second clamp blocks for supporting a third set of hoses of the agricultural machine that extend through the hose clamp assembly; and the third set of hoses has a diameter different from the first set of hoses and the second set of hoses.

7. The hose clamp assembly of claim 1, wherein the first set of openings and the third set of openings comprise at least three semi-circular openings having a first diameter.

8. A hose clamp assembly for use with an agricultural machine, the hose clamp assembly comprising:
   a first clamp block that includes interconnected outer walls that collectively define an outer perimeter of the first clamp block, the outer perimeter of the first clamp block defines:
      a first set of openings that extends as depressions into a first outer wall of the first clamp block; and
      a second set of openings that extends as depressions into a second outer wall of the first clamp block that faces an opposite direction than the first outer wall of the first clamp block;
   a second clamp block that includes interconnected outer walls that collectively define an outer perimeter of the second clamp block, the outer perimeter of the second clamp block defines:
      a third set of openings that extends as depressions into a third outer wall of the second clamp block; and
      a fourth set of openings that extends as depressions into a fourth outer wall of the second clamp block that faces an opposite direction than the first outer wall of the first clamp block; and
   wherein:
      the first and second clamp blocks engage each other with the first outer wall of the first clamp block and the third outer wall of the second clamp block in face-to-face abutment so that the first and third set of openings of the first and second clamp blocks are aligned with each other to provide discrete openings that extend through the entire thickness of each of the first and second clamp blocks for supporting a first set of hoses of the agricultural machine that extend through the hose clamp assembly;
      the first set of openings and the third set of openings comprise at least three semi-circular openings having a first diameter; and
      the second set of openings of the first clamp block comprise at least three semi-circular openings of a second diameter.

9. The hose clamp assembly of claim 8, wherein the fourth set of openings of the second clamp block comprise at least four semi-circular openings of a third diameter.

10. The hose clamp assembly of claim 9, wherein the first diameter is different from the second diameter;
   wherein the second diameter is different from the third diameter; and
   wherein the first diameter is different from the third diameter.

11. The hose clamp assembly for use with the agricultural machine of claim 1, wherein openings are configured to house tubing selected from a group consisting of a hydraulic hose, a propel hose, a suspension hose, a case drain hose, a parking brake hose, and a service brake hose.

12. A hose clamp assembly for use with an agricultural machine comprising, the hose clamp assembly comprising:
   a first clamp block that includes a first outer wall and a second outer wall opposite the first outer wall, the first outer wall and the second outer wall define an outer perimeter of the first clamp block, and the outer perimeter of the first clamp block defines:
      a first set of openings that extends as depressions into the first outer wall; and
      a second set of openings that extends as depressions into the second outer wall;
   a second clamp block that includes a third outer wall and a fourth outer wall opposite the fourth outer wall, where the third outer wall and the fourth outer wall define an outer perimeter of the second clamp block, and the outer perimeter of the second clamp block defines:
      a third set of openings that extends as depressions into the third outer wall; and
      a fourth set of openings that extends as depressions into a fourth outer wall;
   a closure wall that engages one of the second outer wall and the fourth outer wall;
   wherein:
      the first and second clamp blocks engage each other with the first outer walls of the first and second clamp blocks in face-to-face abutment so that the first and third set of openings of the first and second clamp blocks are aligned with each other to provide discrete openings that extend through the entire thickness of each of the first and second clamp blocks for supporting a first set of hoses of the agricultural machine that extend through the hose clamp assembly;
      the closure wall provides discrete openings that extend through the entire thickness of one of the first clamp block and the second clamp block for supporting a second set of hoses of the agricultural machine; and
      a bevel is formed in at least one of the outer perimeters the first and second clamp block, the bevel facilitating the pivoting of the first and second clamp blocks relative to each other.

13. The hose clamp assembly of claim 12, wherein the closure wall is a locking plate that engages at least one of the second outer wall and the fourth outer wall blocks that extends across at least one of the second and fourth sets of openings to support a second set of hoses of the agricultural machine.

14. The hose clamp assembly of claim 12, wherein the first clamp block and the second clamp block are moveable from a first configuration to a second configuration.

15. A hose clamp assembly for use with an agricultural machine comprising, the hose clamp assembly comprising:
   a first clamp block that includes a first outer wall and a second outer wall opposite the first outer wall, the first outer wall and the second outer wall define an outer perimeter of the first clamp block and the outer perimeter of the first clamp block defines:
      as first set of openings that extends as depressions into the first outer wall; and a second set of openings that extends as depressions into the second outer wall;
a second clamp block that includes a third outer wall and a fourth outer wall opposite the fourth outer wall, the third outer wall and the fourth outer wall define an outer perimeter of the second clamp block and the outer perimeter of the second clamp block defines:
a third set of openings that extends as depressions into the third outer wall;
and
a fourth set of openings that extends as depressions into a fourth outer wall;
a closure wall that engages one of the second outer wall and the fourth outer wall;
a fifth set of openings that extends as depressions into the first outer wall of the first clamp block; and
a sixth set of openings that extends as depressions into the first outer wall of the second clamp block;
wherein:
the first and second clamp blocks engage each other with the first outer walls of the first and second clamp blocks in face-to-face abutment so that the first and third set of openings of the first and second clamp blocks are aligned with each other to provide discrete opening that extend through the entire thickness of each of the first and second clamp blocks for supporting a first set of hoses of the agricultural machine that extend through the hose clamp assembly;
the closure wall provides discrete openings that extend through the entire thickness of one of the first clamp block and the second clamp block for supporting a second set of hoses of the agricultural machine; and
the fifth set of openings and the sixth set of openings are aligned with each other to provide discrete openings that extend through the entire thickness of each of the first and second clamp blocks for supporting a third set of hoses of the agricultural machine that extend through the hose clamp assembly.

16. The hose clamp assembly of claim 15, wherein the first set of openings and the third set of openings have a first diameter;
wherein the second set of openings and the fourth set of openings have a second diameter; and
wherein the fifth set of openings and the sixth set of openings have a third diameter.

17. The hose clamp assembly of claim 12, wherein openings are configured to house tubing selected from a group consisting of a hydraulic hose, a propel hose, a suspension hose, a case drain hose, a parking brake hose, and a service brake hose.

18. A hose clamp assembly for use with an agricultural machine comprising:
a first clamp block comprising:
a first outer edge;
a second outer edge opposite the first outer edge;
a first plurality of semi-circular openings extending from the first outer edge toward the second outer edge; and
a second plurality of semi-circular openings extending from the second outer edge toward the first outer edge;
a second clamp block comprising:
a third outer edge;
a fourth outer edge opposite the third outer edge;
a third plurality of semi-circular openings extending from the third outer edge toward the fourth outer edge; and
a fourth plurality of semi-circular openings extending from the fourth outer edge toward the third outer edge; and
a bevel fonned in at least one of the first outer edge of the first clamp block and the third outer edge of the second clamp block, the bevel facilitating the pivoting of the first and second clamp blocks with respect to each other;
wherein the second clamp block is substantially identical in shape to the first clamp block;
wherein the first plurality of semi-circular openings align with the third plurality of semi-circular openings when the first outer edge abuts the third outer edge in a first configuration;
wherein the second plurality of semi-circular openings align with the fourth plurality of semi-circular openings when the second outer edge abuts the fourth outer edge in a second configuration;
wherein a first tube is held between the first clamp block and the second clamp block in the first configuration;
wherein a second tube is held between the first clamp block and the second clamp block in the second configuration;
wherein the first tube has a first diameter;
wherein the second tube has a second diameter; and
wherein the first diameter is larger than the second diameter.

19. A hose clamp assembly for use with an agricultural machine comprising:
a first clamp block including:
a first outer edge;
a second outer edge opposite the first outer edge;
a first plurality of semi-circular openings extending from first outer edge toward the second outer edge:
a second plurality of semi-circular openings extending from the second outer edge toward the first outer edge;
a second clamp block including:
a third outer edge;
a fourth outer edge opposite the third outer edge;
a third plurality of semi-circular openings extending from the third outer edge toward the fourth outer edge;
a fourth plurality of semi-circular openings extending from the fourth outer edge toward the third outer edge;
a fifth plurality of semi-circular openings extending from the first outer edge toward the second outer edge; and
a sixth plurality of semi-circular openings extending from the third outer edge toward the fourth outer edge;
wherein:
the second clamp block is substantially identical in shape to the first clamp block;
the first plurality of semi-circular openings align with the third plurality of semi-circular openings when the first outer edge abuts the third outer edge in a first configuration;
the second plurality of semi-circular openings align with the fourth plurality of semi-circular openings when the second outer edge abuts the fourth outer edge in a second configuration;
a first tube is held between the first clamp block and the second clamp block in the first configuration;
a second tube is held between the first clamp block and the second clamp block in the second configuration;

the first tube has a first diameter;
the second tube has a second diameter;
the first diameter is larger than the second diameter; and
the fifth plurality of semi-circular openings align with the sixth plurality of semi-circular openings when the first outer edge abuts the third outer edge in a first configuration.

20. A hose clamp assembly for use with an agricultural machine comprising:
    a first clamp block including:
        a first outer edge;
        a second outer edge opposite the first outer edge;
        a first plurality of semi-cirular openings extending from the first outer edge toward the second outer edge;
        a second plurality of semi-circular openings extending from the second outer edge toward the first outer edge;
    a second clamp block including;
        a third outer edge;
        fourth outer edge opposite the third outer edge;
        a third plurality of semi-circular openings extending from the third outer edge toward the fourth outer edge;
        a fourth plurality of semi-circular openings extending from the fourth outer edge toward the third outer edge;
    a first bevel formed in the first outer edge of the first clamp block; and
    a second bevel formed in the third outer edge of the second clamp block;
wherein:
    the second clamp block is substantially identical in shape to the first clamp block;
    the first plurality of semi-circular openings align with the third plurality of semi-circular openings when the first outer edge abuts the third outer edge in a first configuration; circular openings when the first outer edge abuts the third outer edge in a first configuration;
    the second plurality of semi-circular openings align with the fourth plurality of semi-circular openings when the second outer edge abuts the fourth outer edge in a second configuration:
    first tube is held between the first clamp block and the second clamp block in the first configuration;
    a second tube is held between the first clamp block and the second clamp block in the second configuration;
    the first tube has a first diameter;
    the second tube has a second diameter;
    the first diameter is larger than the second diameter;
    the second clamp block pivots relative to the first clamp block about the first bevel and the second bevel; and
    the second clamp block pivots away from the first clamp block to release the first tube.

* * * * *